United States Patent [19]

Klingenberg

[11] Patent Number: 4,475,643

[45] Date of Patent: Oct. 9, 1984

[54] STORAGE DEVICE FOR PACKAGES

[75] Inventor: Uwe Klingenberg, Gevelsberg, Fed. Rep. of Germany

[73] Assignee: Maschinenfabrik Alfred Schmermund GmbH & Co., Gevelsberg, Fed. Rep. of Germany

[21] Appl. No.: 415,481

[22] Filed: Sep. 7, 1982

[30] Foreign Application Priority Data

Sep. 24, 1981 [DE] Fed. Rep. of Germany ....... 3137948

[51] Int. Cl.³ .................. B65G 1/04; B65G 61/28
[52] U.S. Cl. .................... 198/347; 198/750; 198/778
[58] Field of Search ............... 198/347, 597, 728, 741, 198/750, 778

[56] References Cited

U.S. PATENT DOCUMENTS 4,085,759 4/1978 Seragnoli .................. 198/347 X
4,089,439 5/1978 Dearlove et al. ............ 198/750 X
4,254,858 3/1981 Seragnoli ...................... 198/347

FOREIGN PATENT DOCUMENTS 1456503 10/1974 Fed. Rep. of Germany .
2402855  7/1975 Fed. Rep. of Germany .
2640867  3/1977 Fed. Rep. of Germany .
3025527  1/1981 Fed. Rep. of Germany .
1435291  5/1976 United Kingdom .
1475773  6/1977 United Kingdom .

Primary Examiner—Joseph E. Valenza
Assistant Examiner—David A. Bucci

[57] ABSTRACT

Articles, for example soft packages, moving on a conveyor belt are diverted into a storage device and subsequently returned therefrom onto the conveyor belt. The storage device comprises a reversible cleated belt which is wound in a spiral on a roller to define closed compartments for the articles.

15 Claims, 3 Drawing Figures

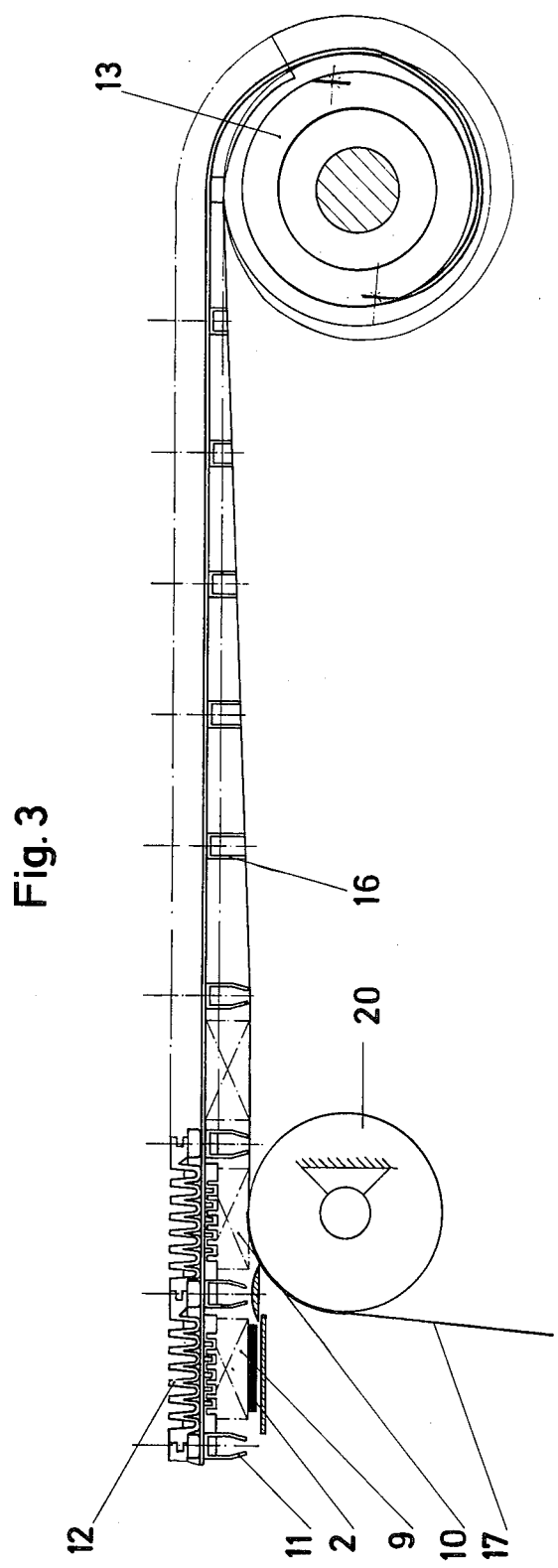

STORAGE DEVICE FOR PACKAGES

BACKGROUND OF THE INVENTION

1. Field of the Invention

The present invention relates to the temporary storage of articles which are being transported between successive processing stations. More specifically, this invention is directed to a storage device for temporarily receiving rectangular packages, which are being transported by means of a conveyor belt from a source station to a receiving station, and for returning the stored packages to the conveyor belt as required. Accordingly, the general objects of the present invention are to provide novel and improved methods and apparatus of such character.

2. Description of the Prior Art

In the manufacture of many products it is common to transport the partially completed product between work stations by means of a system of conveyor belts. Since there may be periods of time when the equipment at either the upstream or downstream station is not operating, it is known to provide devices for receiving the articles from the conveyor and storing such articles for subsequent return to the conveyor. Thus, if the downstream processing machine is stationary, the storage device must receive packages which are being discharged from the machinery at the previous work station. Conversely, if the supply of articles from the previous work station is temporarily interrupted, the storage device must return articles to the conveyor so that the downstream processing station will receive a constant supply. In order to be in readiness for both functions, the storage device should be approximately half filled under normal operating conditions.

Storage devices of the type generally described above are known in the art. In one form of such storage device the articles removed from the conveyor system are stacked upon one another. An example of such a stacking type storage device may be seen from German patent specification No. 1,456,503. While such stacking type storage devices have utility, they cannot be employed with articles which may be crushed such as, for example, soft cigarette packages since the pressure exerted on the packages of the lowest layer may be excessive.

Another type of prior art storage device comprises an endless circulating belt or chain which carries storage cells. The articles being temporarily diverted from the conveyor system are inserted into these storage cells. An example of this type of storage device may be seen from British patent specification No. 1,475,773. Storage devices of the endless circulating belt or chain type have the disadvantage that complicated and thus costly mechanisms are required to achieve the insertion and removal of rows of packages from the cells.

In order to avoid the expense and complexity of the previously known endless circulating belt type storage device, it has been proposed to provide storage devices in which a storage belt itself undertakes the removal from and insertion of rows of articles on the conveyor. A storage device of this type may be seen from published German patent specification Ser. No. 26 40 867. Storage devices of the type shown in German patent application Ser. No. 26 40 867 have the disadvantage of requiring a relatively large amount of space and this space requirement, in turn, interfers with the monitoring of the apparatus since the view of supervisory personnel is completely or partially blocked. In order to reduce the size of the apparatus, as shown in published German patent application Ser. No. 24 02 855, it has been proposed to store rows of articles in a number of side-by-side and one-above-another storage cylinders. It has been found, however, that the use of such storage cylinders, in the case of soft cigarette packages, results in excessive stresses being imposed on the packages by the constant transferring of the packages from one storage cylinder to another.

A further possibility of providing for the volumetrically efficient temporary storage of articles removed from a conveyor is described in published German patent application Ser. No. 30 25 527. In the apparatus of German application Ser. No. 30 25 527 rows of packages are placed on individual carrier elements and the separation between these carrier elements is made variable so that, at the receiving or removal location, there is sufficient space to move the packages while, in the storage location, the packages or other articles are positioned close to one another. However, the provision of such relatively movable individual carrier elements results in a costly mechanical system and the space required for the storage device remains relatively large which, as noted above, is undesirable.

SUMMARY OF THE INVENTION

The present invention overcomes the above-briefly discussed and other deficiencies and disadvantages of the prior art by providing for the storage of articles, particularly soft rectangular articles, removed from a conveyor in a safe and volumetrically efficient manner until such articles are to be returned to the conveyor. Apparatus in accordance with the present invention comprises a storage conveyor in the form of a belt with cleats which delimit channels open to one side to receive individual rows of articles for the temporary storage of such articles in a manner which mechanically stresses the articles to a minimum degree, which requires no auxilliary mechanisms to move the articles above and on to the conveyor system and which occupies minimal space and particularly which is characterized by minimum projection above the conveyor system.

In accordance with the preferred embodiment, the cleated storage conveyor is bi-directional whereby it may be wound onto and off of supply and receiving rollers. As the storage conveyor is wound onto the receiving roller the rows of packages will be loosely captured in radially closed compartments formed between successive windings of the storage conveyor.

BRIEF DESCRIPTION OF THE DRAWINGS

The present invention may be better understood and its numerous objects and advantages will become apparent to those skilled in the art by reference to the accompanying drawing wherein like reference numerals refer to like elements in the several FIGURES and in which:

FIG. 3 is a partial cross-sectional view, on an enlarged scale, of the apparatus of FIG. 1.

DESCRIPTION OF THE DISCLOSED EMBODIMENT

Figure 1:
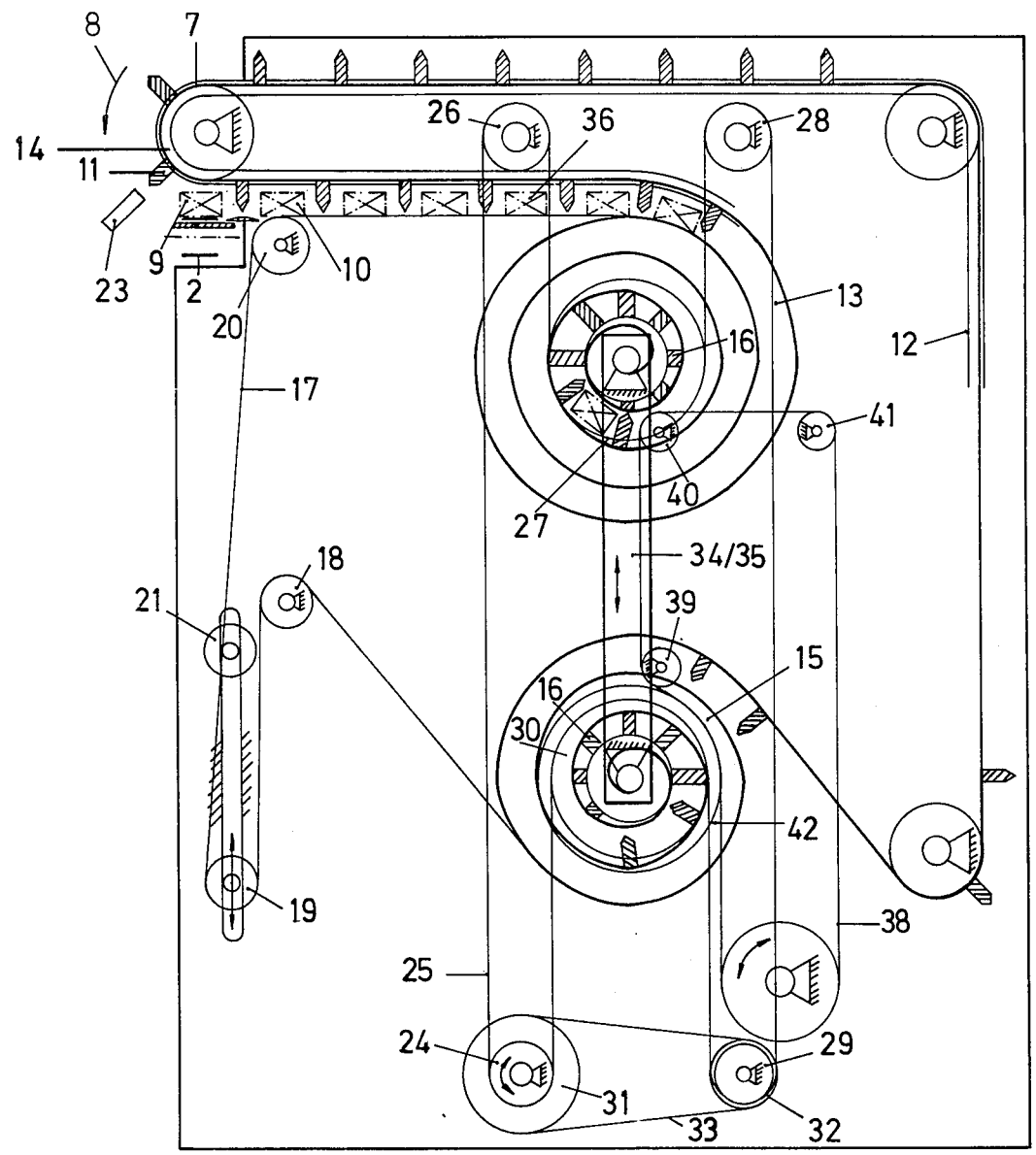
FIG. 1 is a schematic cross-sectional front elevation view of apparatus in accordance with a first embodiment of the invention.

While not limited thereto in its utility, the present invention will be described in the environment of a storage device for use in a cigarette packaging system. Thus, referring to FIG. 2 of the drawing, cigarette packages 4 move along a series of conveyor belts 1, 2 and 3 in the direction indicated by arrow 5. For purposes of explanation it may be presumed that the packages delivered to belt 1 have been individually wrapped in clear foil in a wrapping machine and are being transported to a bundle packager by belt 3. In order to separate a row of packages, for example the row indicated at 9, from the series of packages moving along the conveyor system, a barrier 6 will be raised. Referring to FIG. 1, when the barrier 6 is raised a storage belt 7 is advanced in the direction indicated by arrow 8. The storage belt 7 is provided with a series of cleats or projections 11 and the interval between these cleats is, as may be seen from the drawing, larger than the width of the individual packages 4. When receiving articles from or returning articles to the conveyor system, the storage belt 7 is advanced in step-wise fashion by an amount equal to one division, i.e., the interval between two of the cleats 11. Thus, in the example being described, a row of packages 9 consisting of eight packages will be removed from conveyor belt 2 and transferred to the position indicated at 10 in FIG. 1 for each step of movement of belt 7 in the direction of arrow 8. As may be seen from FIG. 3, in addition to the cleats 11, the storage belt 7 is provided on its opposite side with spacers 12. The height of cleats 11 and spacers 12 is greater than the height of the packages 4. It is to be noted that storage belt 7 need not be provided with cleats 11 and spacers 12 over its entire length. Thus, when a receiving roll 13, the function of which will be described below, is entirely empty, no cleats are necessary on that portion of the storage belt 7 which extends between roll 13 and the above-mentioned position 10. Conversely, when the receiving roll 13 is full, no cleats are required on that portion of storage belt 7 which extends between a supply roll 15, and a guide roller 14.

In order to achieve a smooth, i.e., approximately round, transition from the smooth or un-cleated portion of belt 7 to the cleat-bearing portion thereof 7, auxiliary bars 16 are provided on the storage belt. The auxiliary bars 16 are located in a region corresponding to the circumference of the rolls 13 and 15. As may be seen from FIG. 3, the height of the auxiliary bars 16 decreases in steps. This insures that the final diameter of the rolls 13 and 15, i.e., the maximum diameter, is held to a minimum.

Returning again to consideration of FIG. 1, when the row of packages is transferred off the conveyor 2 onto storage belt 7, at position 10, it will be supported on a smooth auxiliary belt 17. The auxiliary belt 17 is rolled, together with the storage belt 7, onto and off of supply reel 15 and receiving reel 13. In the intermediate location, belt 17 is passed over rollers 18, 19 and 20. The position of roll 19 may be adjusted between locations 19 and 21 in order to equalize the length of the two belts, i.e., to maintain the desired belt tension and compensate for stretching, etc.

Figure 2:
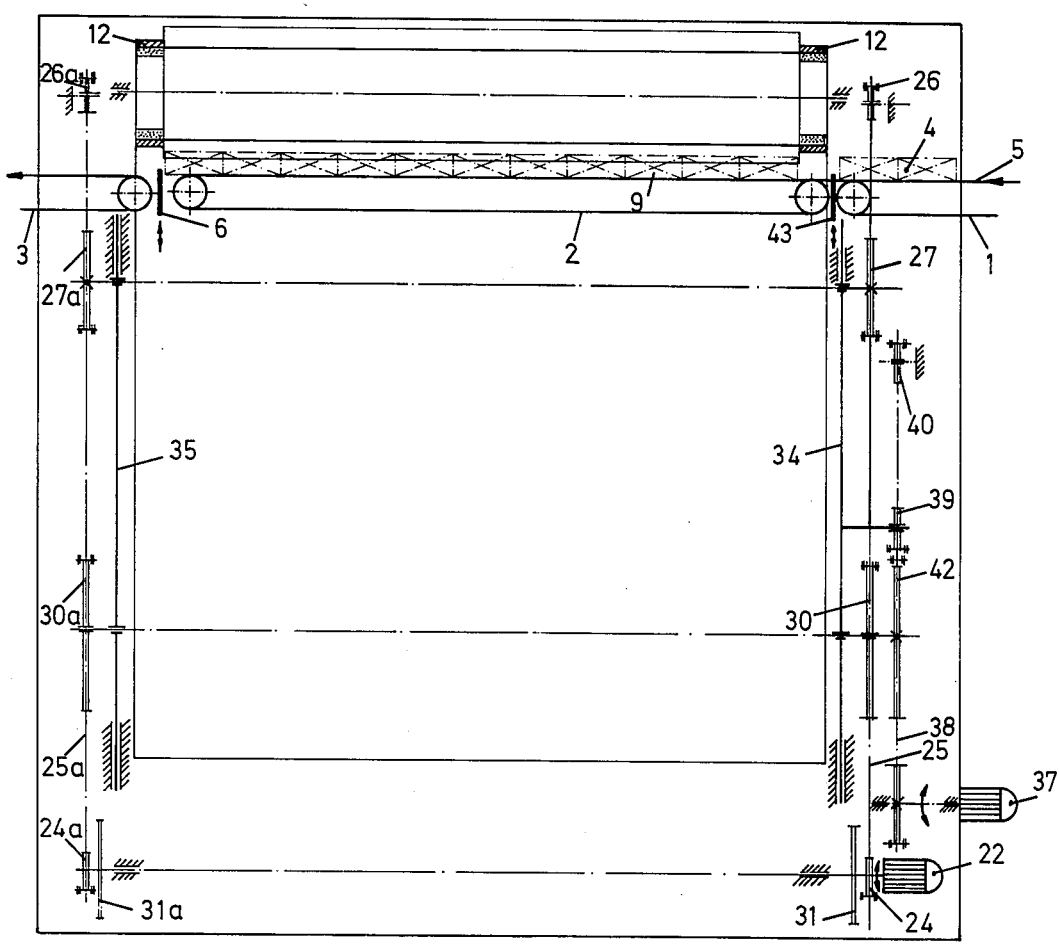
FIG. 2 is a simplified schematic side view of the apparatus of FIG. 1.

Referring jointly to FIGS. 2 and 3, the drive for receiving roll 13 comprises a motor 22 which is preferably an air motor. Motor 22 will, as noted above, be actuated in steps commensurate with the divisions of storage belt 7. The length 15 of these steps may be controlled by means of a sensor 23 which may be any suitable device, for example, optical or magnetic, for sensing the position of the cleats 11. Motor 22, via a sprocket 24, drives a chain 25 which passes over sprockets 26, 27, 28, 29 and 30. The sprockets 26, 28 and 29 are stationary. Sprocket 27 is connected to and thus drives the receiving roll 13 while sprocket 30 runs freely on the shaft of supply roll 15. The drive arrangement is provided on both sides of the conveyor system with the elements on the second side of the system as shown in FIG. 2 being identified by the subscript a. The rollers 13 and 15 are interconnected by a pair of bars 34, 35 which define a common slidably mounted block. This block can be displaced so that the tangential entry region of the storage belt 7 onto the receiving roll 13 is always maintained at the same height. Sprockets 31 and 32 are respectively rigidly connected to sprockets 24 and 29 and are of different diameter. The sprockets 31 and 32 are interconnected by a chain 33. Accordingly, as a result of the conversion over sprockets 31 and 32, there will be a difference in length between the chain sections passing over respective of sprockets 27 and 30. This difference in length causes the upward or downward movement of the axes of the rolls 13 and 15 and the block defined by bars 34 and 35. The conversion between sprockets 31 and 32 is chosen such that the vertical location of the uppermost row of packages on the supply roll 13, the row of packages indicated at 36 in FIG. 1, remains essentially constant.

Supply roll 15 is driven by means of a motor 37 (FIG. 2) which is preferably an air motor. However, it will be understood by those skilled in the art that other types of motors may be employed. Supply roll 15 is coupled to the output shaft of motor 37 by means of a drive chain 38 which passes over the guide wheels 39, 40, 41 and 42, guide wheel 42 being affixed to roll 15. The motor 37 serves only to maintain the storage belt 7 under tension and, when necessary, to wind belt 7 onto the supply roll 15. Accordingly, motor 37 will provide an approximately constant torque and will not otherwise be controlled.

When it is desired to return a row of packages 9 to conveyor belt 2, a barrier 43 will be raised to create space on the belt 2. The direction of travel of storage belt 7 is then reversed when compared to the direction of arrow 8 and during each stepwise movement of belt 7 a row of packages will be redeposited on conveyor belt 2.

As should be obvious from the preceeding description, the present invention relates to a storage device for articles 4, such as cigarette packages, which are being serially moved along a conveyor system. The storage device of the invention includes a mechanism 6 which partitions individual sequences of packages, as indicated at 9, out of the series. Apparatus in accordance with the invention further comprises a bi-directional storage conveyor 7 which removes the rows of packages directly from the conveyor system and, as needed, replaces the rows of packages onto the conveyor system. The storage conveyor 7 takes the form of a belt with cleats 11 which delimit channels open to one side for receiving the rows of packages removed from the conveyor. In order to avoid stressing the articles removed from the conveyor system, and in the interest of obviating the necessity of providing additional mechanisms for moving the packages, the storage conveyor and the rows of packages located between the cleats thereof are wound in a spiral onto a receiving roll whereby the rows of packages are stored in closed compartments formed between successive windings of the storage conveyor.

It is to be understood that the present invention is not limited to the embodiment described and shown herein, which is deemed to be merely illustrative of the best mode of carrying out the invention, and which is susceptible of modification of form, size, arrangement of parts and details of operation. The invention rather is intended to encompass all such modifications which are within its spirit and scope as defined by the claims.

What is claimed is:

1. Apparatus for temporarily storing rows of articles removed from a conveyor system and returning such articles to the conveyor system as required comprising:
   storage conveyor means, said storage conveyor means including a belt having spaced projections on at least a first side thereof, said spaced projections defining open-sided channels which are oriented generally parallel with respect to the direction of motion of the conveyor system, said belt in part being in proximity to the conveyor system;
   means for imparting motion to said storage conveyor means belt, said motion imparting means being reversible and causing said belt projections to contact and move groups of articles from the conveyor system and return such groups of articles to the conveyor system; and
   receiving means, said receiving means including a receiving roll, said storage conveyor means belt being wound onto and off of said receiving roll in response to said motion imparting means whereby rows of articles positioned between said belt projections may be temporarily stored in radially closed compartments formed between successive windings of said storage conveyor means belt.

2. The apparatus of claim 1 wherein said receiving means further comprises:
   support belt means, said support belt means including a flat belt which is movable in synchronism with said storage conveyor means belt, said flat belt being positioned to support groups of articles immediately upon movement thereof from the conveyor system, said flat belt being wound onto and off of said receiving means roll with said storage conveyor means belt.

3. The apparatus of claim 2 further comprising:
   supply roll means, a portion of said storage conveyor means belt which is not occupied by groups of articles removed from the conveyor system being rolled on said supply roll.

4. The apparatus of any of claims 1, 2 or 3 wherein said storage conveyor means further comprises:
   spacers on said belt, said spacers extending outwardly from the second side of said belt in a direction opposite to the direction of said projections, said spacers having a height which is greater than the height of the articles to be stored.

5. The apparatus of claim 4 wherein said projections are provided on said storage conveyor means belt over the length thereof used for storing and wherein said storage conveyor means belt, on the same side as said projections and in at least a first end portion thereof, is provided with a plurality of outwardly extending bars which decrease in height in stepwise fashion from the last of said projections toward the end of the said storage conveyor means belt.

6. The apparatus of claim 3 further comprising:
   means rigidly coupling said receiving means roll and said supply roll means, said coupling means being movable to maintain the tangential entry region of said receiving means roll at a constant height relative to the conveyor system.

7. The apparatus of claim 4 further comprising:
   means rigidly coupling said receiving means roll and said supply roll means, said coupling means being movable to maintain the tangential entry region of said receiving means roll at a constant height relative to the conveyor system.

8. The apparatus of claim 6 wherein said means for imparting motion to said storage conveyor means belt comprises an air motor.

9. The apparatus of claim 3 further comprising:
   means for applying constant tension to said storage conveyor means belt.

10. The apparatus of claim 9 wherein said constant tension applying means comprises an air motor coupled to said supply roll means.

11. The apparatus of claim 9 wherein said constant tension applying means comprises a rotary field magnet coupled to said supply roll means.

12. The apparatus of claim 9 further comprising:
    means rigidly coupling said receiving means roll and said supply roll means, said coupling means being movable to maintain the tangential entry region of said receiving means roll at a constant height relative to the conveyor system.

13. The apparatus of claim 12 wherein said means for imparting motion to said storage conveyor means belt simultaneously causes displacement of said rigid coupling means.

14. The apparatus of claim 13 wherein said means for imparting motion to said storage conveyor means belt produces stepwise motion of said belt and further comprises means for sensing the position of a projection on said belt.

15. The apparatus of claim 14 further comprising:
    means for maintaining a constant tension on said support belt means flat belt, said tension maintaining means comprising movable idler roll.

* * * * *